United States Patent [19]
Do et al.

[11] Patent Number: 6,122,019
[45] Date of Patent: Sep. 19, 2000

[54] DISPLAY DEVICE

[75] Inventors: Sung-Dae Do; Kwey-Hyun Kim, both of Suwon, Rep. of Korea

[73] Assignee: SamSung Electronics Co., Ltd., Suwon, Rep. of Korea

[21] Appl. No.: 08/917,063

[22] Filed: Aug. 25, 1997

[30] Foreign Application Priority Data

Aug. 23, 1996 [KR] Rep. of Korea ...................... 96-25539
Aug. 23, 1996 [KR] Rep. of Korea ...................... 96-25540

[51] Int. Cl.[7] .................................................. H04N 5/64
[52] U.S. Cl. ........................................... 348/843; 348/839
[58] Field of Search ................................ 312/7.2, 223.1, 312/223.2, 223.6, 265.5, 265.6; 364/708.1; 348/787, 794, 836, 843, 839; 361/682; 455/347, 348, 349; 292/80, 87

[56] References Cited

U.S. PATENT DOCUMENTS

| | | |
|---|---|---|
| 3,251,939 | 5/1966 | Pestka et al. ........................ 348/843 X |
| 3,255,311 | 6/1966 | Hofmeister et al. ................ 348/843 X |
| 4,716,493 | 12/1987 | Zelkowitz ........................... 348/836 X |
| 4,769,741 | 9/1988 | Smith . |
| 4,841,412 | 6/1989 | Heys, Jr. et al. ................ 312/223.2 X |
| 5,053,881 | 10/1991 | Campisi ................................... 348/836 |
| 5,257,163 | 10/1993 | Buist et al. . |
| 5,294,994 | 3/1994 | Robinson et al. .................. 348/836 X |
| 5,810,461 | 9/1998 | Ive et al. .............................. 312/223.6 |

*Primary Examiner*—Janet M. Wilkens
*Attorney, Agent, or Firm*—Robert E. Bushnell, Esq.

[57] ABSTRACT

A monitor is provided that conceals the cable connection parts of the power and the signal cables inside the monitor's housing, which improves the monitor's appearance. The design of the rear housing and its attachments reduces manufacturing defects related to the signal cable caused while attaching the front and rear portions of the housing. Thus, improving production efficiency during the assembly of the monitor. The power and signal cables are connected to the monitor's interfaces in a direction perpendicular to the bottom of the housing. This reduces the space required between the monitor and a wall to avoid damaging the cable connections while rotating the monitor. The monitor also has a box inside the rear housing module which allows users to store a manual and small-sized tools in the box.

20 Claims, 7 Drawing Sheets

DISPLAY DEVICE

This application makes reference to, incorporates the same herein, and claims all rights accruing thereto under 35 U.S.C. § 121 through a foreign application entitled Display Device earlier filed in the Korean Industrial Property Office on Aug. 23, 1996 and there duly assigned Serial No. 1996/25539 and Serial No. 1996/25540.

BACKGROUND OF THE INVENTION

1. Field of the Invention

The present invention relates to a display device and, more particularly, to process and to a monitor that conceals both the power cable and signal cable connection parts while engaging a vertically oriented power cable.

2. Background Art

The typical monitor generally has a stand and an outer housing, composed of a front and rear portion, which holds a cathode ray tube (e.g., a cathode ray tube) and a printed circuit board (e.g., a PCB). Typically the power and signal cables extend from the back of the rear housing in a direction parallel to the bottom of the housing. The internal structure of a typical monitor has a video PCB. Small sized monitors use a video PCB that is mounted in the rear end of the cathode ray tube through a socket.

We have found that with the increased size of monitors however, the video PCBs weigh too much, and are too large, to mount to the rear of the cathode ray tube. Mounting the heavier and larger video PCBs on the rear of the cathode ray tube reduces the operational reliability of the monitor because the electron gun tends to break during the manufacturer's drop test or during the transportation of the monitor. To avoid the problems caused by mounting a large video PCB on a cathode ray tube, a second video PCB is placed in the monitor.

The cables connected to a typical monitor protrude from the housing in a direction parallel to the bottom of the housing. This requires monitors to be spaced away from a wall to allow a user to effectively rotate them. We have observed that the cables which protrude from a monitor's housing spoil the monitor's appearance. I have further observed that a monitor's cable connections often twist and can accidentally separate from the monitor when the monitor is tilted or rotated. This can also happen when the cable connections strike a wall while the monitor is being rotated. As such, the typical monitor located near a wall has its maneuverability limited. We expect that a monitor that has covered cable connection parts will be more esthetically pleasing. Further, We believe that the maneuverability problem can be solved by using cable connections that protrude from the housing in a direction perpendicular to the bottom of the housing.

SUMMARY OF THE INVENTION

It is an object of the current invention to provide an imposed process and apparatus for connecting a monitor to a processing system.

It is another object to provide a monitor that conceals the cable connection parts of the power cable and the signal cable, thus improving the appearance of the device.

It is another object to provide a monitor which greatly reduces manufacturing defects related to the signal cable caused when the front and rear portions of the housing are joined, and thereby improves the efficiency of monitor manufacture.

It is yet another object to provide a monitor that has a power cable which is connected to the monitor's power cable interface in a direction perpendicular to the bottom of the housing so that accidental disconnections of the power cable caused by rotating and tilting the monitor are reduced.

It is still another object to provide a monitor that has both its power and signal cables protruding from its housing in a direction perpendicular to the bottom of the housing so that the monitor can be placed near a wall without impeding its rotation and tilting.

It is still yet another object to provide a monitor which has a box inside a back cover, which is attached to the rear portion of the housing, that allows a user to store a manual or small-sized tools, thereby increasing convenience for the user.

It is a further object to provide a monitor with enclosed brackets attached to its outer housing and located below its cable connection interfaces to allow excess cable to be wound around the brackets thereby removing the possibility of accidental cable separation from the monitor.

It is a further object still to provide a monitor that has attachments to the rear portion of the housing that are easy to remove for repairs.

These and other objects may be achieved by making various modifications to the housing and configuration of the monitor components. The use of a signal cable opening through the rear portion of the housing allows the signal cable to pass through the housing before it is attached to the signal cable interface on the monitor. A back cover is then attached to the rear portion of the housing to conceal the cable contact parts. The concealment of the signal cable connection enhances the aesthetic appeal of the monitor. The orientation of the power and signal cables in a direction perpendicular to the bottom of the housing allows the monitor to be more functional in tight spaces. This reduces the amount of space that must be left between the monitor and a wall to avoid contact between the cable connection parts and the wall. Thus, increasing the number of locations at which the monitor can be stationed and increasing the overall maneuverability of the monitor. An enclosed box built into a rear housing module can provide a convenient place for a user to store books or small tools. The simple design of the new monitor makes it easy to repair.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein.

DESCRIPTION OF THE PREFERRED EMBODIMENTS

Figure 1:
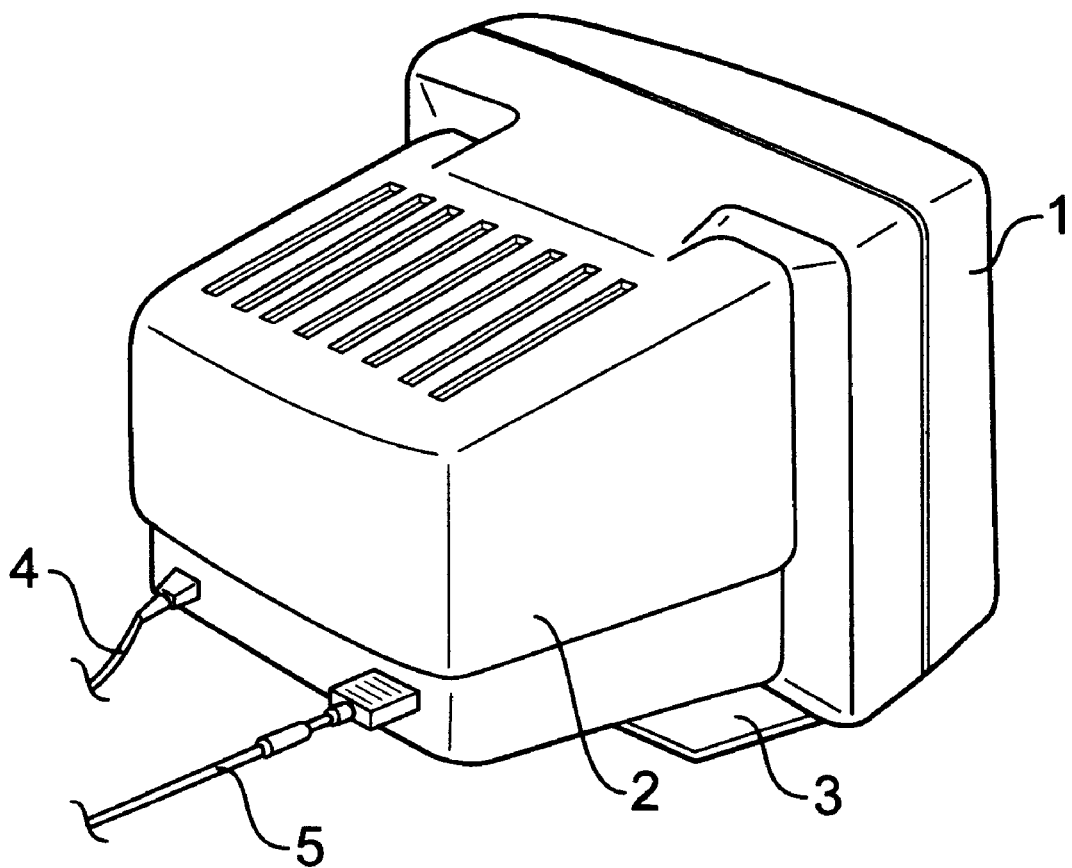
FIG. 1 is a rear perspective view of a typical monitor with power and signal cables that connect to the monitor's housing in a direction parallel to the bottom of the housing.
Figure 2:
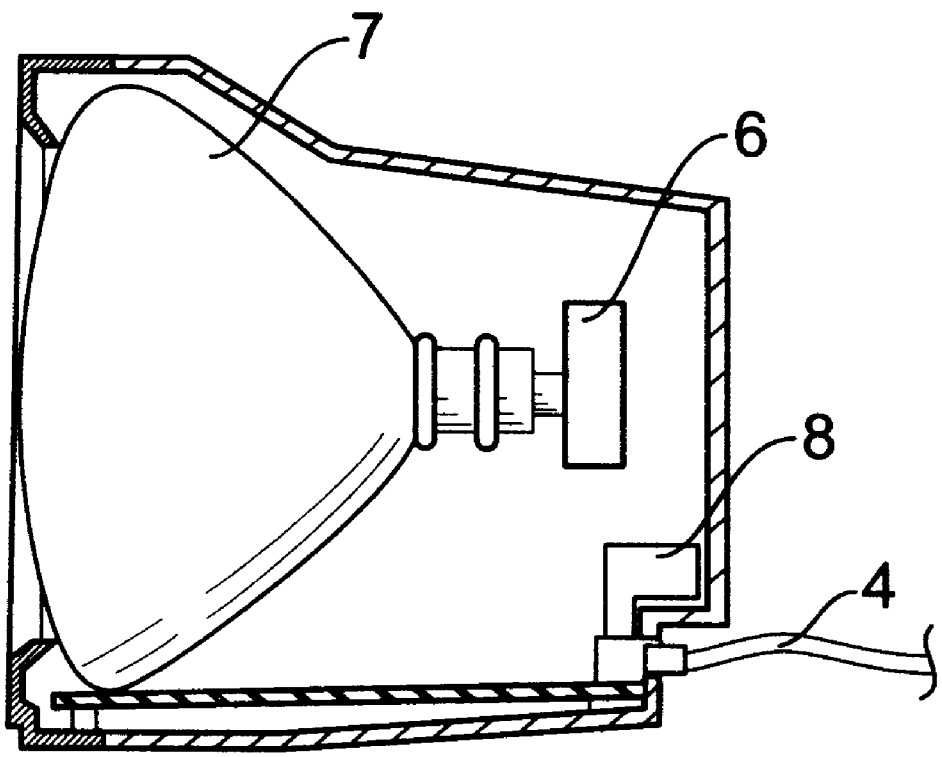
FIG. 2 is a cross-sectional view of the interior structure of a typical monitor.

Referring to the drawings, particularly FIG. 1, which illustrates a typical monitor. As shown in FIG. 1, a typical monitor consists of a stand 3 and an outer housing, composed of a front 1 and rear 2 portion, which holds a cathode ray tube (cathode ray tube, not shown) and a printed circuit board (PCB, not shown). Typically the power 4 and signal 5 cables extend from the back of the rear housing in a direction parallel to the bottom of the housing. FIG. 2 shows the internal structure of a typical monitor with a video PCB. Small sized monitors use a video PCB 6 that is mounted to the rear end of the cathode ray tube 7 through a socket.

However, with the increasing size of monitors the video PCBs weighed too much, and were too large, to mount to the rear of the cathode ray tube. Mounting the heavier and larger video PCBs on the rear of the cathode ray tube reduces the operational reliability of the monitor because the electron gun tends to break during the manufacturer's drop test or during the transportation of the monitor. To avoid the problems caused by mounting a large video PCB on a cathode ray tube 7 a second video PCB 8 is placed in the monitor.

FIG. 2 further shows the how the power cable 4 connected to a typical monitor protrudes from the housing in a direction parallel to the bottom of the housing. This requires monitors to be spaced away from a wall to allow a user to effectively rotate them.

As we discussed above, the cables which protrude from a monitor's housing spoil the monitor's appearance. We have also observed that a monitor's cable connections often twist and can accidentally separate from the monitor when the monitor is tilted or rotated. This can also happen when the cable connections strike a wall while the monitor is being rotated. As such, the typical monitor located near a wall has its manueverability limited. We expect that a monitor that has covered cable connection parts will be more esthetically pleasing. Thus, we believe that the maneuverability problem can be solved by using cable connections that protrude from the monitor's housing in a direction perpendicular to the bottom of the housing.

Figure 3:
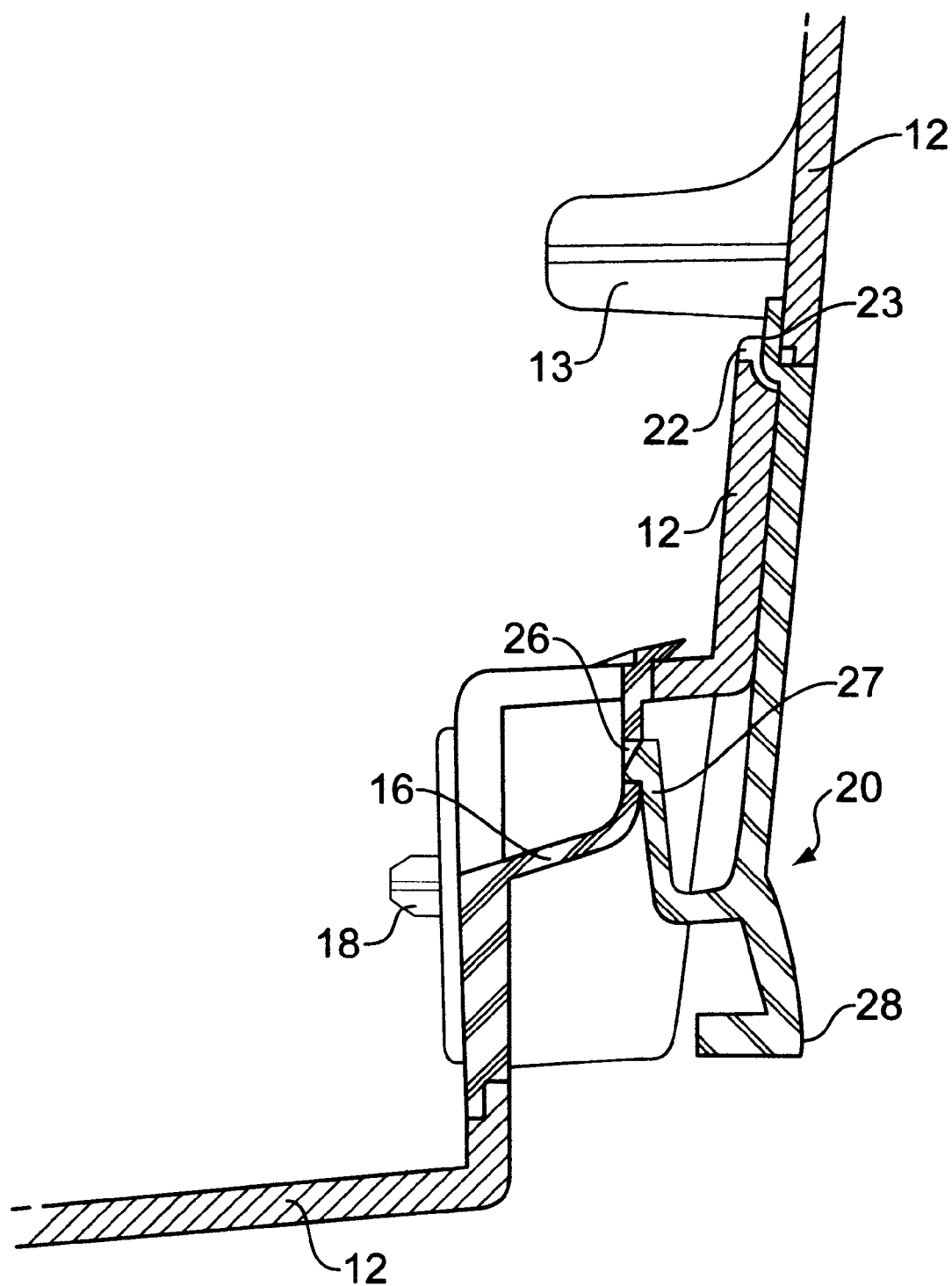
FIG. 3 is a cross-sectional view of the new monitor's rear housing, signal cable cover, and back cover in their assembled position.
Figure 4:
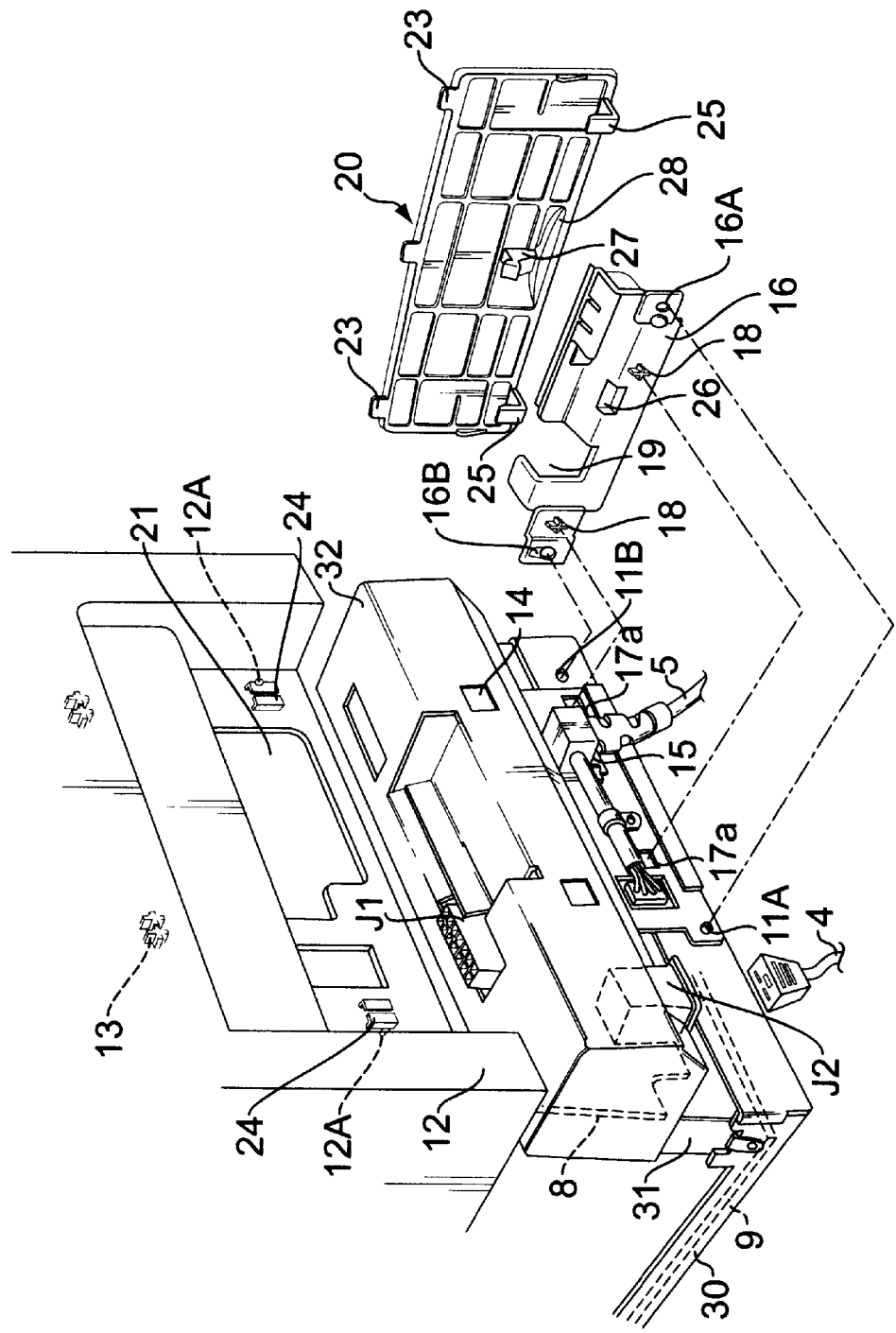
FIG. 4 is an exploded perspective view of the new monitor's rear housing structure and related connections.
Figure 5:
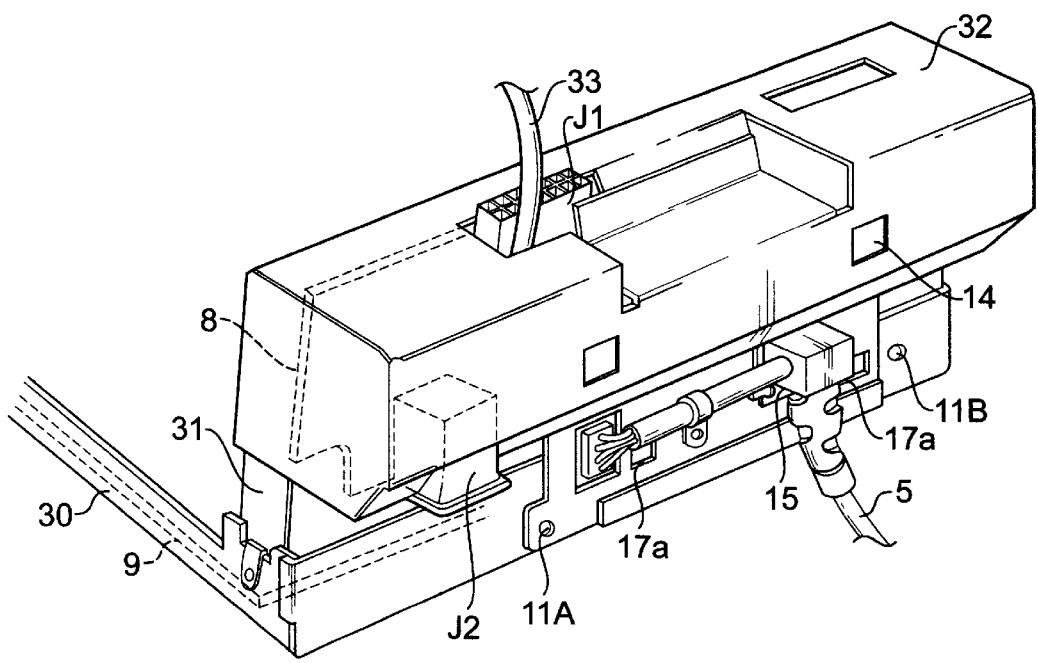
FIG. 5 is an enlarged perspective view of a second video PCB installed in a new monitor.

Turning now to FIGS. 3 through 5 of the the drawings, particularly FIG. 4, which shows the first embodiment of the current invention. A main PCB 9 is attached to a main PCB bracket 30, which is attached to the front portion of the housing (not shown). A video bracket 31 is mounted to the rear corners of the PCB bracket 30 and holds a video PCB 8 at the top. The video PCB 8 has a jack J1, through which the video PCB 8 is connected to a cathode ray tube. A video shield 32 is attached to the video bracket 31 and covers and protects the video PCB 8.

The video shield 32 has a locking slot 14, which is brought into engagement with a locking protrusion 13 of the rear portion of the housing 12. The locking protrusion 13 is attached to the inner surface of the rear portion of the housing 12 and has an H-shaped cross-section. A signal cable interface is located on the video shield 32 below the locking slot 14. The signal cable 5 provides input to the video PCB 8 and is connected to the signal cable interface 15. The video shield 32 also includes a power cable interface J2, which is connected to the main PCB 9 using a connecting cable 33. The power cable 4 is engaged in a direction perpendicular to the bottom of the housing, as shown in FIG. 4.

The signal cable 5 passes through the rear portion of the housing 12 using opening 21, which is designed to expose all of the signal cable interface 15, which is located on the video PCB 8. The opening 21 is large enough to allow the signal cable 5 to be on the outside of the rear portion of the housing 12 when the video PCB 8 is vertically attached to the housing 12. The opening 21 is covered with a signal cable cover 16, which has a locking protrusion 18 and a groove 19, which allows the signal cable 5 to pass through the signal cable cover 16. The locking protrusion 18 engages with a locking hole 17a on each side of the signal cable interface 15 and is reinforced by screws which pass through holes 16A and 16B.

A back cover 20 conceals the signal cable interface 15 and is attached to the rear portion of the housing 12. The back cover 20 covers all of the signal cable cover 16. The back cover 20 has an upper protrusion 23, a side catch 25, a central latch 27 and a latch release 28. The upper protrusion 23 is brought into engagement with a locking recess 22 provided on the rear portion of the housing 12 at a position above the cable passage opening 21. The side catch 25 is formed on the inner surface of the back cover 20 at each lower side position and engages a locking member 24 located on the rear housing 12. The central latch 27 is located on the inner surface of the back cover 20, between the two side catches 25, and engages the seating recess 26 on the signal cable cover 16. This prevents the cover from accidentally separating from the rear housing 12. The latch release 28 is located on the outer surface of the back cover 20. When it is necessary to remove the back cover, the latch release is activated by pressing down on the latch release with a finger.

This embodiment is assembled in the following manner. The main PCB bracket 30 is attached to the front housing of the monitor prior to mounting the video bracket 31 to the main PCB bracket 30. Then, the video PCB 8 is mounted to the video bracket 31, along with a video shield 32, a video PCB 8, and a jack J1.

The signal cable cover 16 is attached to the video shield 32 by inserting the cover's locking protrusions 18 into the locking holes 17a on the main bracket 30. In order to prevent the unexpected removal of the signal cable cover 16 from the main bracket 30, the screw holes 16A and 11A are aligned so that the signal cable cover 16 can be screwed onto the main bracket 30. The signal cable 5 is then connected to the signal cable interface 15 and placed through the groove 19 in the signal cable cover 16.

The signal cable cover 16 is positioned over the signal cable opening 21 of the rear portion of the housing 12. The holes 12A, which is located at one side of each locking member 24 of the rear portion of the housing 12, are aligned with a respective hole 16A, 16B, located on the signal cable cover 16, and the screw holes 11A, 11B, located on the main PCB bracket 30, and both the signal cable cover 16 and the main PCB bracket 30 are screwed to the rear housing 12. The signal cable cover 16 covers the signal cable opening 21 in the rear portion of the housing 12.

The back cover 20, which conceals the signal cable interface 15, is attached to the rear housing 12. The back cover has upper protrusions 23 and side catches 25 that are engaged with the locking recess 22 and the locking member 24 of the rear portion of the housing 12. A locking member 24 is located on each side of the cable passage opening 21. In addition, the central latch 27, which is located on the inner surface of the back cover 20, is engaged with the seating recess 26 of the signal cable cover 16. This prevents the back cover 20 from separating from the rear portion of the housing 12.

It is more efficient to attach and position the signal cable 5 during manufacturing because the signal cable cover 16 is a separate piece, which is attached to the opening 21 after the housing is assembled. The appearance of the monitor is also improved because the signal cable interface is concealed by the back cover 20.

The design of this new monitor makes repairs more efficient. To repair a PCB one first removes the back cover 20 from the rear portion of the housing 12 by activating the latch release 28. The latch release is located on the outer surface of the back cover 20. Once the latch is released, the upper protrusion 23 and the side catch 25 of the cover 20 disengage from both the locking recess 22 and the locking member 24. Then, one unscrews the signal cable cover 16 and exposes the signal cable interface 15 of the video PCB 8. At this point, one can easily make necessary monitor repairs.

Figure 6:
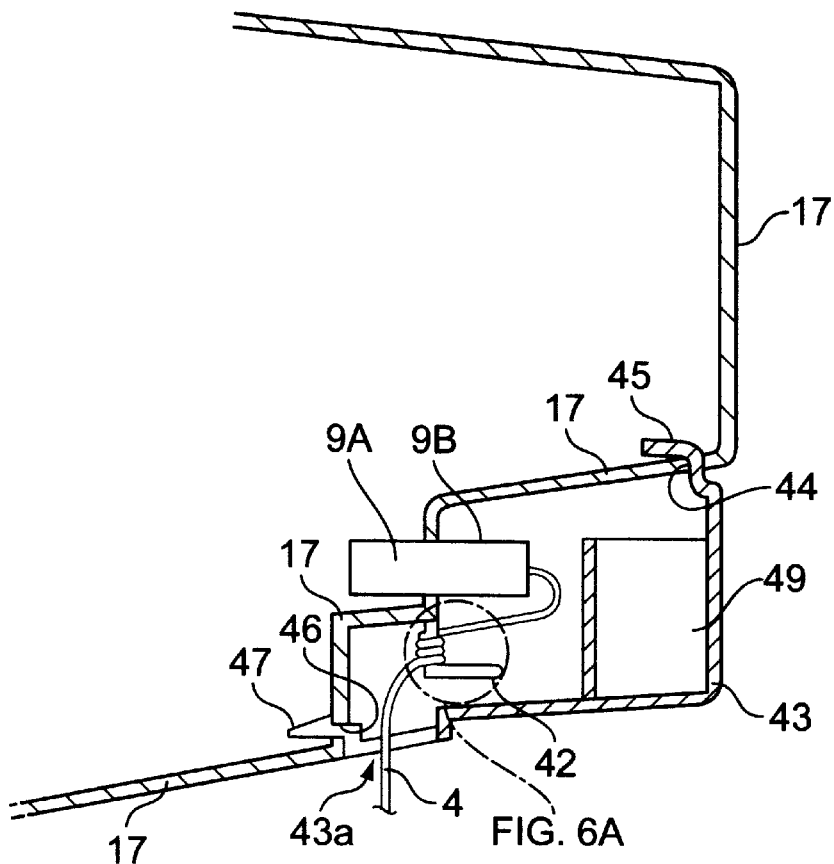
FIG. 6 is a cross-sectional view showing second embodiment of the new monitor, and more specifically, this monitor's outer housing, rear housing module with an attached box, and a power cable wrapped around a bracket, which is attached to the outer housing.
Figure 6A:
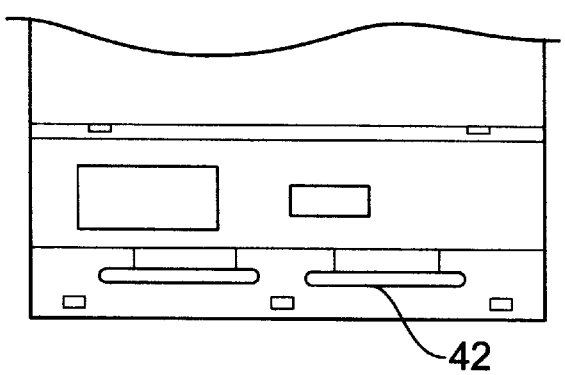
FIG. 6A is a rear view of the outer housing.
Figure 7:
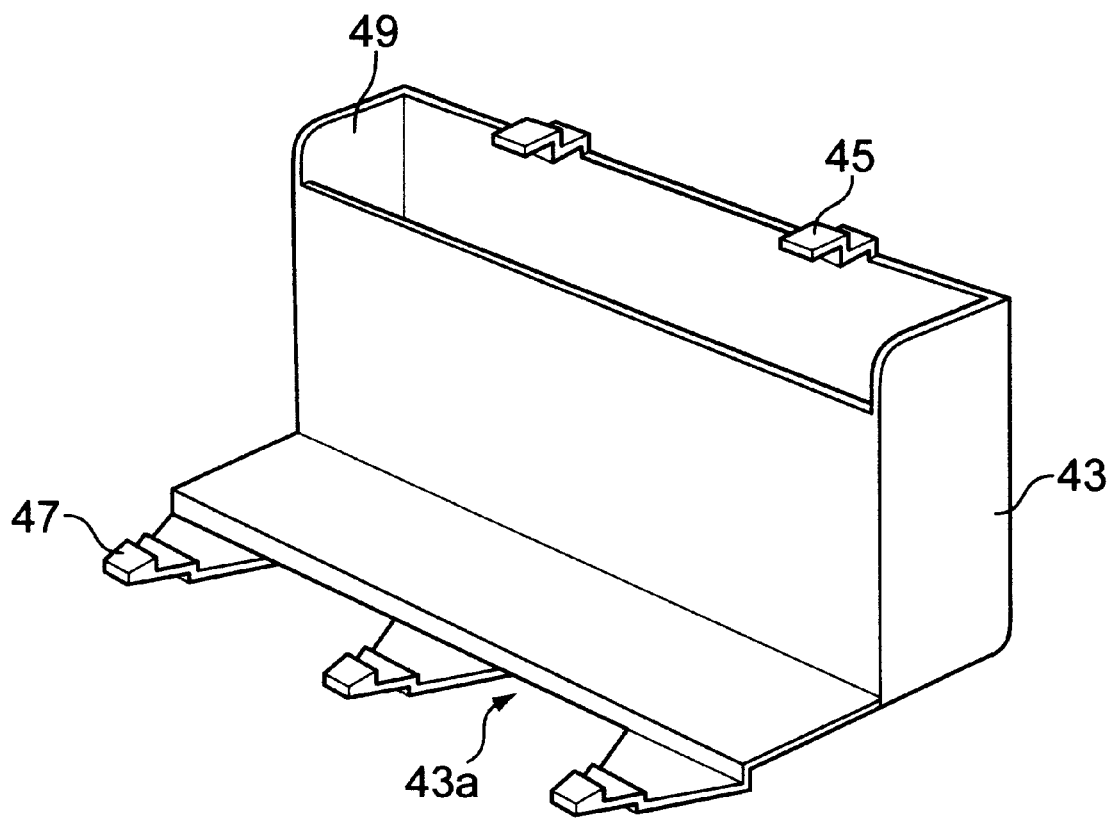
FIG. 7 is a perspective view of the rear housing module, which has a built-in box, that can be attached to the outer housing of the monitor.

Referring to FIGS. 6, 6A and 7, particularly FIG. 6, shows the second embodiment of this new monitor. It shows the outer housing 17 having at least one bracket 42 under the power cable socket 9B and the power cable interface 9A. The cables are wrapped around the appropriate brackets 42 thereby taking up some of the slack in the cables and, more importantly, preventing the cable connections from being accidentally disconnected from the monitor when it is rotated or tilted.

In addition, a rear housing module 43 is attached to the outer housing 17 and conceals the brackets 42. Rear housing module 43 is attached using a locking protrusion 45, which engages the locking recess 44 of the outer housing 17. A latch 47 engages the locking recess 46 of the outer housing 17. This prevents the back cover from separating from the outer housing 17.

Rear housing module 43 contains a box 49, which is located on the module's interior. The box 49 may be used for storing a manual and/or small-sized tools. This enhances a user's convenience and helps avoid the loss of tools needed for computer repairs. The interface for the power cable 4 is concealed from the outside by the rear housing module 43, and the power cable 4 protrudes from an opening or perforation 43a in a direction perpendicular to the bottom of the outer housing 17. This improves the appearance of the monitor and makes it easier to keep the work area neat and clean. The power cable 4 is prevented from twisting or accidentally separating from the monitor because it is wound around the bracket 42.

In every embodiment, this new monitor conceals the cable interfaces which gives the monitor an improved appearance. The easier installation of the signal cable in the first embodiment improves the efficiency of assembling the monitor. By connecting the power cable in a direction perpendicular to the bottom of the housing a user is now able to use more of the space between the monitor and a wall. This also prevents the power cable from being twisted while the monitor is rotated or tilted. It further prevents the cable from being unexpectedly disconnected from the monitor when the monitor is rotated or tilted while improving the appearance of the system into which the monitor has been incorporated.

Still another advantage of this invention is the added convenience of an enclosed box, which can store a manual and/or small-sized tools.

Although two preferred embodiments of the present invention have been disclosed for illustrative purposes, those skilled in the art will appreciate that various modifications, additions and substitutions are possible, without departing from the scope and spirit of the invention as disclosed in the accompanying claims. It is also possible that other benefits or uses of the currently disclosed invention will become apparent over time.

What is claimed is:

1. A monitor, comprising:

a body enclosing a main bracket, said main bracket supporting a main printed circuit board, said body having a front portion and a rear portion, said rear portion of said body having a signal cable opening;

a video bracket secured to said main bracket in a direction perpendicular to said main bracket, said video bracket positioned to be located near said rear portion of said body;

a video printed circuit board braced by said video bracket, said video printed circuit board communicating with an interface for connecting to a signal cable, said interface positioned to be within a perimeter of said signal cable opening;

a video shield attached to said video bracket and protecting said video printed circuit board;

said interface for engaging said signal cable so as to hang said signal cable in a direction perpendicular to said main bracket;

a signal cable cover positioned near said rear portion of said body and covering said signal cable opening, said signal cable cover having a groove for accommodating said signal cable when said signal cable cover is in a mounted position; and a back cover attached to said rear portion of said body by a locking mechanism, said back cover concealing said interface.

2. The monitor according to claim 1, further comprised of said locking mechanism comprising:

an upper protruding member located on an upper portion of said back cover, said upper protruding member engaging a locking recess that is located on said rear portion of said body; and said back cover having a central latch that engages a seating recess in said signal cable cover preventing the accidental separation of said back cover from said rear portion of said body.

3. The monitor according to claim 2, further comprised of said back cover having a latch release attached to an outer surface of said back cover for disengaging said central latch from said seating recess in said signal cable cover, said latch release being activated by pressure.

4. The monitor according to claim 3, further comprised of said signal cable cover having a plurality of locking protrusions located on an inner surface of said signal cable cover for engaging with a plurality of locking recesses located on a supporting member, said supporting member attached to said main bracket.

5. The monitor according to claim 4, further comprised of said video shield containing a power cable interface for engaging a power cable, said power cable interface oriented for engaging the power cable in a direction perpendicular to said main bracket.

6. The monitor according to claim 2, further comprised of said signal cable cover having a plurality of locking protrusions located on an inner surface of said signal cable cover for engaging with a plurality of locking recesses located on a supporting member, said supporting member attached to said main bracket.

7. The monitor according to claim 6, further comprised of said video shield containing a power cable interface for engaging a power cable, said power cable interface oriented for engaging the power cable in a direction perpendicular to said main bracket.

8. The monitor according to claim 2, further comprised of said video shield containing a power cable interface for engaging a power cable, said power cable interface oriented for engaging the power cable in a direction perpendicular to said main bracket.

9. The monitor according to claim 1, further comprised of said back cover having a latch release attached to an outer surface of said back cover for disengaging a central latch from a seating recess in said signal cable cover, said latch release being activated by pressure.

10. The monitor according to claim 9, further comprised of said signal cable cover having a plurality of locking protrusions located on an inner surface of said signal cable cover for engaging with a plurality of locking recesses located on a supporting member, said supporting member attached to said main bracket.

11. The monitor according to claim 10, further comprised of said video shield containing a power cable interface for engaging a power cable, said power cable interface oriented for engaging the power cable in a direction perpendicular to said main bracket.

12. The monitor according to claim 9, further comprised of said video shield containing a power cable interface for engaging a power cable, said power cable interface oriented for engaging the power cable in a direction perpendicular to said main bracket.

13. The monitor according to claim 1, further comprised of said signal cable cover having a plurality of locking protrusions located on an inner surface of said signal cable cover for engaging with a plurality of locking recesses located on a supporting member, said supporting member attached to said main bracket.

14. The monitor according to claim 13, further comprised of said video shield containing a power cable interface for engaging a power cable, said power cable interface oriented for engaging the power cable in a direction perpendicular to said main bracket.

15. The monitor according to claim 1, further comprised of said video shield containing a power cable interface for engaging a power cable, said power cable interface oriented for engaging the power cable in a direction perpendicular to said main bracket.

16. A monitor, comprising:

a main housing containing a main bracket, a main printed circuit board, and a video printed circuit board; and a video shield attached to said main bracket for protecting said video printed circuit board, said video shield containing a power cable interface, said power cable interface oriented to engage a power cable for said monitor in a direction perpendicular to a bottom of said main housing.

17. A monitor, comprising:

an outer housing;

a rear housing module attached by a locking mechanism to said outer housing, said rear housing module having a perforation for receiving a power cord;

an interface for engaging the power cord located on said outer housing in an area covered by said rear housing module; and a bracket attached to a rear of said outer housing below said interface, said bracket for winding said power cord around said bracket so as to protrude said power cord from said perforation in said rear housing module in a direction perpendicular to a bottom of said outer housing.

18. The monitor according to claim 17, further comprised of said rear housing module having a box on the inside of said rear housing module.

19. The monitor according to claim 17, further comprised of said locking mechanism comprising:

an upper protrusion located on a upper portion of said rear housing module for engaging with a locking perforation in said outer housing; and a latch located on a lower portion of said rear housing module for engaging with a locking member located on said outer housing and preventing the separation of said rear housing module from said outer housing.

20. The monitor according to claim 19, further comprised of said rear housing module having a box on the inside of said rear housing module.

* * * * *